June 2, 1925. 1,540,165
J. CYTRON
BAG HOLDING AND MEASURING APPARATUS
Filed Dec. 11, 1922 2 Sheets-Sheet 1
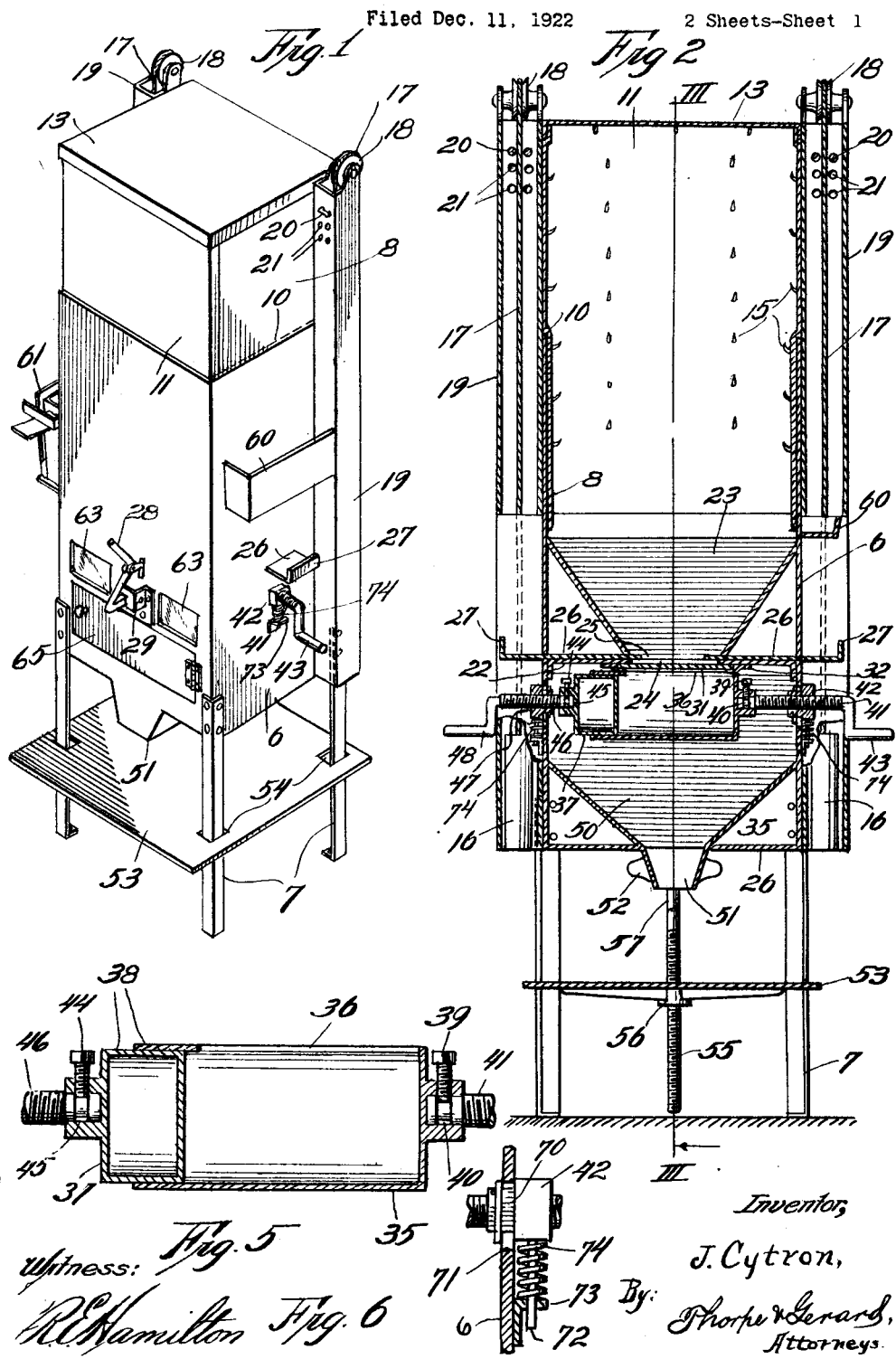
Inventor,
J. Cytron,
By Thorpe & Gerard,
Attorneys

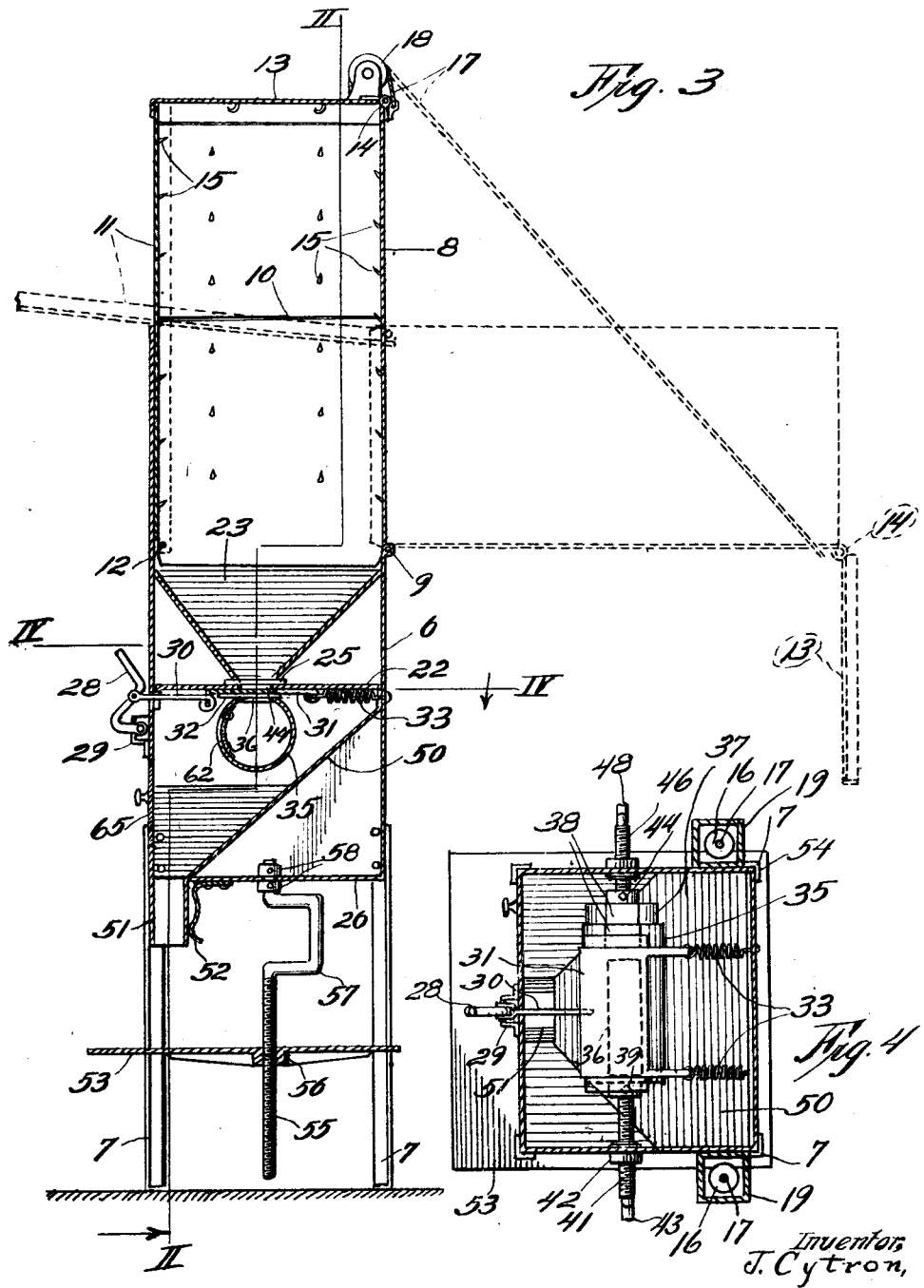

Patented June 2, 1925.

1,540,165

UNITED STATES PATENT OFFICE.

JULIUS CYTRON, OF TULSA, OKLAHOMA.

BAG HOLDING AND MEASURING APPARATUS.

Application filed December 11, 1922. Serial No. 606,176.

*To all whom it may concern:*

Be it known that I, JULIUS CYTRON, a citizen of the United States, and resident of Tulsa, county of Tulsa, State of Oklahoma, have invented a certain new and useful Improvement in Bag Holding and Measuring Apparatus, of which the following is a complete specification.

The present invention relates to measuring devices, with particular reference to the measurement of dry material of a granular character or of such a consistency that it may be caused to flow through a hopper and its movement regulated by the action of suitable valves.

One of the objects of the invention is to provide an apparatus of this type particularly adapted for sacking purposes, in the operation of which a bag containing a considerable quantity of the material to be sacked may be conveniently supported in position for discharging the material into a measuring device for measuring a smaller quantity of the material and dumping the same into a passage communicating with the sack to be filled. The construction of the bag holding means is such to permit operation in a quick and easy manner for mounting a bag in dumping position and for removal of the empty bags and replacing with full ones. The measuring device is readily adjustable to vary its capacity or volume and easily operated from receiving to discharging position, in addition to which the flow of the material from the supply into the measuring device may be conveniently regulated in accordance with the character of the material as regards its fineness or flowing quality.

It is a further object to provide an apparatus of the nature described in which is included an adjustable support or platform for the sacks being filled, in order that the same may be maintained in the most practical receiving relation to the mouth of the discharge passage leading from the measuring device.

With these general objects in view, the invention will now be described by reference to the accompanying drawings illustrating one form of construction which I have devised for embodying the proposed improvements, after which those features deemed to be novel will be particularly set forth and claimed.

In the drawings—

Figure 1 is a perspective view illustrating a measuring apparatus constructed in accordance with the present invention;

Figure 2 is an enlarged vertical sectional view of the same, representing a section taken on the line II—II of Figure 3;

Figure 3 is a similar view, representing a section taken on the line III—III of Figure 2;

Figure 4 is a transverse section taken on the line IV—IV of Figure 3;

Figure 5 is an enlarged detail sectional view of the vessel forming part of the measuring device, and Figure 6 is an enlarged sectional detail view illustrating one of the bearings of the measuring receptacle.

Referring now to the drawings in detail, these illustrate the improved construction as comprising a box-like frame 6 supported by legs 7. The rear wall of this frame is open part way from the top for accommodating the swinging movements of a pivoted bin 8, the lower rear edge of which is hinged, as indicated at 9, to the top edge of said rear wall of the frame 6 (see Figure 3). Preferably the top of the bin is of the same width as the frame 6, while the lower portions of the side walls of the bin are offset inwardly along the lines 10 sufficiently to fit inside the frame 6, thereby reinforcing the support of the bin when in vertical position. The front wall 11 of the bin is pivoted to the lower front corners of the bin, as indicated at 12, and the bin is provided with a flanged top or cover 13 hinged at 14 to the upper margin of the rear wall of the bin. The interior faces of all the walls of the bin, and its cover 13, are provided with barbs 15 for suitable engagement with a bag (not shown) designed to be placed within the bin in inverted position, the barbs of the wall 11 being somewhat straighter than the others, as illustrated in Figure 3. The bin structure is such as to allow it to swing from the full line to dotted line position represented in Figure 3, for removing an empty bag and inserting a filled one, the return of the bin to vertical position being facilitated by the action of counterweights 16 carried by cords 17 attached to the upper rear corners of the bin. The counterweight cords operate over pulleys 18 at the upper ends of housings 19 attached to the sides of the frame 6 and serving as runways for the weights 16. Staples 20 are inserted through openings 21 in the upper ends of the housings 19 to adjustably limit the upward movements of the weights 16, and thereby regulate the outward and downward movement of the bin.

Within the frame 6 and above a horizontal partition 22 therein is arranged the hopper 23 in position to receive material as discharged from the bin, and in turn to discharge such material through an opening 24 in said partition into the measuring device. The size of the outlet passage 25 from this hopper is regulated by means of a pair of slides 26 adjusted from opposite directions by manipulation of handle portions 27 at opposite sides of the frame 6. The discharge of the material from the hopper is effected by operation of a lever 28 fulcrumed in a bracket 29 at the front of the frame 6 and connected by a link 30 to a slide valve 31 operating in guides 32 carried by the underface of the partition 22 at opposite sides of its opening 24; the closing of said valve 31 is effected automatically by the action of a pair of springs 33 connecting the valve with the rear wall of the frame 6 (see Figures 3 and 4).

The measuring device into which the material is discharged past the valve 31 comprises an approximately cylindrical vessel 35 having a receiving and discharging opening 36, and an approximately cylindrical follower member 37 telescoping within one end of said vessel. These telescoping parts are slightly flattened in line with the opening 36, as indicated at 38 in Figure 4, so that both parts are obliged to rotate in unison. The vessel 35 is provided with a hub portion fitted with a set screw 39 engaging a groove 40 on the inner end of a screw 41 threaded through a bearing 42 at one side of the frame 6 and having an operating handle 43. The follower member 37 is similarly provided with a hub portion fitted with a set screw 44 engaging a groove 45 on the inner end of a screw 46 operating with a left-hand thread through a bearing 47 at the other side of the frame 6 and having an operating handle 48. Each of the bearings 42 and 47 is formed with a pair of parallel straight grooves 70 at the sides of the bearing, for engagement with the side edges of the corresponding opening 71 of the frame 6.

Each of said bearings 42 and 47 is also provided with a depending stem 72 slidingly engaging a bracket 73, between which brackets and bearings are interposed compression springs 74 for maintaining the bearings normally in elevated position. Thus, the bearings are prevented from turning and at the same time permitted a slight vertical sliding movement, as required for permitting the initial movement of the vessel 35 from receiving to discharging position, and also restoring the same with the flattened upper faces of the vessel and follower member 37 in proper snug-fitting relation to the valve 31. It is apparent that by loosening either or both of the screws 39 and 44 of the corresponding screws 41 and 46, the position of the follower 37 within the vessel 35 may be varied for correspondingly varying the measuring capacity of the latter, and thereafter on tightening up the set screws the rotation of the screws 41 and 46 will effect rotation of the vessel and its follower in unison, with the follower remaining in fixed relation to the vessel 35, due to the oppositely threaded character of said screws. The measuring device may thus be operated from either side of the frame, and it will be understood that the same is simply given a half-turn for discharging the contents of the vessel 35, and then a half-turn in the opposite direction to receiving position.

Below the measuring device and within the lower portion of the frame 6 is located another hopper 50 having a discharge spout 51 at the front of said frame for delivering the material or goods into a bag or other receptacle. Preferably, a spring element 52 is attached to the bottom of the frame 6 in position for clamping the mouth of the bag or sack in proper relation to the spout 51. I also provide an adjustable platform 53 for supporting the bag or sack at the proper elevation below said spout, this platform being formed with guide openings 54 for the legs 7 of the frame, and also with a combined supporting and adjusting screw 55 in threaded engagement with a simple boss 56 formed on said platform. For operating the screw 55, the same is formed with a handle 57 at its upper end, and the upper end of the handle is fitted with collars 58 for rotatable and supporting connection with the bottom of the frame 6, as clearly illustrated in Figure 3.

In the operation of the apparatus, a sack-holding compartment 60 may be provided at one side of the frame 6, and in some cases it is also desirable to locate a suitable tape dispensing and moistening device at the other side of the apparatus, as indicated at 61, which device may preferably take the form of the attachment illustrated in my copending application Serial No. 606,177, of even date herewith. I also find it desirable to provide a transparent panel 62 in the measuring vessel 35, visible through windows 63 of the frame 6, in order that the operator may determine whether or not the material is falling properly into the measuring device. A suitable door 65 may also be provided for obtaining convenient access to the interior of the hopper 50 and the parts below the partition 22.

In the use of the above described apparatus, the bin 8 is pulled backward against the action of the counterweights 16 into the position indicated by the dotted line in Figure 3, in which operation the front wall 11 swings forward and the cover 13 downward, as shown, this opening movement of the bin being limited by the staples 20. With the bin in open position, a bag containing the material may be placed upon the rear wall of the bin, with the mouth of the bag open at the hinge end of the bin, after which the cover 13 is swung up against the bottom of the bag and the bin then lifted into upright position to allow the contents of the bag to discharge into the hopper 23; the flanged structure of the cover 13 serves to securely retain the parts in this upright position. This brings one side of the bag in engagement with the front wall 11 of the bin, and the combined action of all the barbs 15 serves both to support the bag and hold it open, i. e., keeps it from collapsing as the material flows out of it. The slides 26 are adjusted to regulate the size of the discharge opening 25 of the hopper 23, which will vary according to the flowing consistency of the material, some flowing more freely than others according to the fineness or granular character of the material; for example, rice will flow somewhat more freely than beans, coffee and the like, and on the other hand some material will have a tendency at times to cake, such as sugar and the like, and the outlet from the hopper must be regulated to suit the requirements by means of the sides 26. As above explained, the measuring volume of the vessel 35 may also be regulated by means of the screws 41 and 46 and by the same means adjusted to bring its opening 36 in register with the openings 24 and 25. When these adjustments have been made, the slide valve 31 may be operated by its lever 28 to fill the vessel 35 with a charge of the material, said valve being immediately, by the action of its spring 33, on releasing said lever. A sack of the required size is placed upon the platform 53 with the mouth of the sack in position to receive the contents from the spout 51, the platform having been adjusted by the screw 55 to suit the size of the sack, and the latter, if desired, held in place by the spring 52. By rotation of either handle 43 or 48, the vessel 35 may now be given a half rotation to discharge its contents into the hopper 50 and thence into the sack, thereby completing the operation. This turning of the vessel by the screws imparts to both it and the follower member 37 a longitudinal movement axially of the screws, and in the same direction, and hence without affecting the volume of the vessel; since this axial movement is so slight, however, it is apparent that practically, for most purposes, the screw 46 could be employed merely in connection with the adjustment of the measuring volume and the set screw 44 left loose, and the screw 41 operated entirely for dumping the vessel 35 and moving the latter relatively to the follower 37 the distance between two threads. But it is thought preferable to connect both screws 41 and 46 for operating the vessel and thereby enabling the latter to be operated by the handles 43 and 48 at either side of the machine. As fast as the sacks are filled at the spout 51, the attendant completes the packaging operation by sealing the sacks by means of tape from the device 61, and replacing the filled sacks with empty ones. As soon as the supply bag is empty, the bin is again opened, which action strips the bag off the barbs of the front wall 11, and the attendant then proceeds to remove the bag from the remaining barbs and replace with another full bag ready to repeat the operation.

It will thus be seen that I have devised a very efficient and improved apparatus for carrying out rapidly the operation of measuring out given quantities of material from bags of the same, and facilitating the packaging of the same in the desired form, and operation, of considerable practical importance in connection with the business of retail stores where merchandise of the character indicated is received in large packages and must be parceled out for the retain trade. While I have illustrated and described what I now regard as the preferred form of construction, I desire to reserve the right to make all such changes or modifications as may fairly fall within the appended claims.

What I claim is:

1. Measuring apparatus comprising a hopper having a discharge opening, a measuring device in receiving relation to said opening and comprising an approximately cylindrical vessel and a follower member telescoping within said vessel, means for independently adjusting said vessel and follower member for relatively moving the same to vary the measuring capacity of said vessel, said means being operable to rotate said measuring device into either receiving or discharging position.

2. Measuring apparatus comprising a hopper having a discharge opening, a measuring device in receiving relation to said opening and comprising an approximately cylindrical vessel partially flattened at one side for embracing said discharge opening, rotating members for supporting and turning said measuring device into either receiving or discharging position, and bearings carrying said rotating members and adapted for slight translational movement to permit the passage of the flattened side of said measuring device into and out of receiving position.

In witness whereof I hereunto affix my signature.

JULIUS CYTRON.